Jan. 5, 1926.
R. SCHWANDA
SLIDE RULE
Filed August 26, 1921
1,568,475
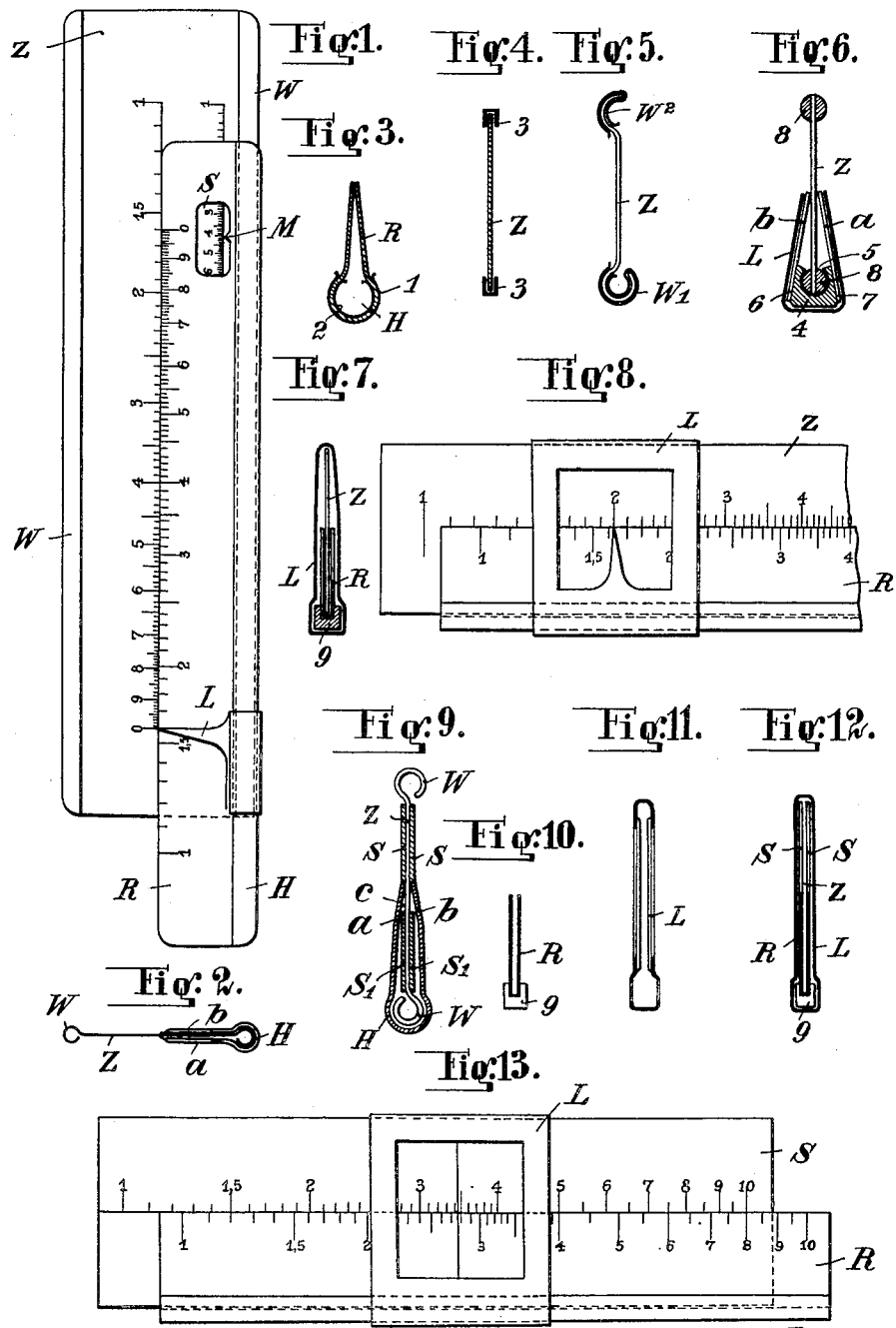

Patented Jan. 5, 1926.

1,568,475

UNITED STATES PATENT OFFICE.

RICHARD SCHWANDA, OF HOTTING-INNSBRUCK, AUSTRIA.

SLIDE RULE.

Application filed August 26, 1921. Serial No. 495,701.

*To all whom it may concern:*

Be it known that I, RICHARD SCHWANDA, a citizen of the Austrian Republic, residing at Hotting-Innsbruck, Austria, have invented certain new and useful Improvements in Slide Rules (for which I have filed application in Austria July 30, 1920, and April 23, 1921, and in Germany July 19, 1921), of which the following is a specification.

My invention relates to slide rules. The slide rules heretofore known are generally made of wood, card board and the like and the groove is formed of several parts which are combined so as to reliably and accurately guide the slide and the index. Such slide valves can at present only be produced at very high prices on account of the accuracy required and the nature of the material used. The consequence is that many people who ought to use a slide rule are unable to do so.

The object of my invention is to provide a slide rule which can be manufactured cheaply but at the same time is very accurate.

In the drawings affixed to this specification and forming part thereof, I have illustrated several modifications of my invention.

Fig. 1 is an elevation and

Fig. 2 a cross section of one modification,

Figs. 3 to 7 are cross-sections of other modifications.

Fig. 8 is a view similar to Figure 1 of Fig. 7,

Figs. 9 to 12 are cross sections of a slide rule having several scales on the slide.

Fig. 13 is a view similar to Figure 1 of Fig. 12.

The slide rule illustrated in Figs. 1 and 2 consists of a U-shaped body R. The body is formed from a strip of thin material which can be bent and at the same time possesses a certain stiffness, such as sheet metal. The strip is doubled up until both its lateral parts $a$ and $b$ are nearly in contact with each other along their edges. While bending a strip, the bottom of the U-shaped part is extended to form a sleeve H. The slide Z is a strip, the length of which is equal to that of the U-shaped body and which is made of the same material as the U-shaped body or another material, and provided at both ends with beads W. The beads are of somewhat smaller diameter than the sleeve H of the body R so that they can freely move in it, while the edges of the lateral parts $a$ and $b$ resiliently engage the flat portion of the slide.

The lateral parts $a$ and $b$ of the U-shaped body and both sides of the slide are provided with scales which co-operate. These scales may be printed, etched, etc. in any manner convenient for quantity production. As the amount of material used for the slide is in proportion to its length, in the present modification, in order to obtain the greatest accuracy with the smallest amount of material possible, only simple scales marked with the numerals 1 to zero are provided on the lateral parts $a$ and $b$ of the U-shaped body, while the same scales, but in reciprocal arrangement, are provided on the slide. The slide rule is used in the known manner, the two factors being placed over each other and the result is read at a mark. Owing to this arrangement of the scales, a slide rule which is only five inches long has the same accuracy as a slide valve of the ordinary type which is ten inches long. The number of scales which cooperate in the present arrangement, is 2. Obviously, any number of scales may be provided if the slide Z and the lateral parts $a$, $b$ are made wider.

In order to be able to read a scale which is concealed by the lateral parts $a$, $b$, these parts are provided with openings S, which, if desired, may be provided with an index M. It is also possible to place U-shaped bodies like R on both beads W of the slide Z, which increases the number of scales to 4. Both U-shaped bodies may be adapted to be adjusted independently or combined into a rigid frame. In order to mark a divisional line on a scale, indexes L L' on tubes provided with glass vanes on which marks are etched, are provided to slide on sleeve H on the U-shaped body R.

This slide rule can be manufactured by the most simple operations and entirely mechanically by quantity production and at the same time with the greatest accuracy, so that the object of my invention is obtained with the smallest expense possible.

When using a material which is not sufficiently stiff or strong or cannot be formed readily into the desired shape, the bottom of the U-shaped body must either be strengthened by thicker material of suitable shape or made entirely of such material.

In the modification illustrated in Fig. 3 the sleeve H of the U-shaped body R is strengthened by 2 slotted tubes 1 and 2 of sheet metal. Tube 1 is placed into and tube 2 over the sleeve H, the shape of the tubes being such that on the one hand they firmly engage the material between them, while on the other hand the lateral parts a, b of the U-shaped body are in such position that their edges engage the slide Z with resilient pressure.

The beads W of slide Z may be formed by U-shaped strips of plate 3, as in Fig. 4, which are placed over the edges of the slide. These strips may be formed to a cylindrical sleeve W¹, see bottom of Fig. 5, or only bent to such an extent as is necessary for guiding the slide in the sleeve H, see W², top of Fig. 5.

In Fig. 6 a modification is illustrated in which the bottom of the U-shaped body is entirely made of stronger material than the lateral parts, in the present case of a strip of wood having a groove 5, in which the bead 8 of slide Z is guided. The cross section of strip 4 is such that the edges of the lateral parts a and b which are attached to the faces 6 and 7 of the strip 4, engage slide Z under resilient pressure, while the strip 4 makes a guide for the index L sliding on it. The beads of the slide Z are here for use by semicylindrical strips 8 of wood. Two such strips are attached to either side of the slide forming beads of circular cross section which are guided in the groove 5 of the strip 4.

In Fig. 7 a modification is illustrated in which the bottom of the U-shaped body R consists of a strip of wood 9 without a special guiding groove for the slide Z. The slide has no beads, but with its edge engages the bottom of the U-shaped body R. In order to prevent the slide lifting from the bottom of the U-shaped body, the index L for marking the divisional lines of the scale, which is guided on the strip 9 is so formed, that it encloses the body R as well as the slide Z at the same time, permitting lateral displacement of the slide in the U-shaped body but holding down the slide on the bottom of the U-shaped body.

In all the modifications illustrated a certain inaccuracy or parallaxis occurs when the lines of the scales are not viewed at right angles, because the scales on the slide and the lateral parts are at a distance from each other equal to the thickness of the plate or other material.

With very thin material and for ordinary purposes, this inaccuracy may be neglected, whereas it is unconvenient with greater thickness of material and when very exact readings are necessary.

In Figs. 9 to 12 modifications are illustrated in which this drawback is removed. In both cases, strips S, S or S¹, S¹, respectively, provided with scales are fixed on the slide Z, the edges of which abut against the edges of the lateral parts a, b. If the scale strips and lateral parts a, b are of the same thickness, the scales will be in the same plane.

In the modification illustrated in Fig. 11, the slide Z is provided with two scale strips S, S and S¹, S¹ at the top and bottom. Between the two pairs of strips there is an open space C where the two lateral parts engage the slide. By reversing the position of the slide, it is possible to operate with 6 different scales.

The modification illustrated in Figs. 10 to 13 has only two scales S, S on the slide Z. It is similar to that illustrated in Figs. 7 and 8. The U-shaped body R and the index L are shown in Figs. 10 and 11 separately. The slide cannot be reversed here. It is held in the manner described by a loop shaped index L and the part of the slide which is in the U-shaped body R only serves for guiding.

I wish it to be understood that I do not desire to be limited to the exact details of construction shown and described, for obvious modifications will occur to a person skilled in the art.

I claim:

1. A slide rule comprising in combination, two flat slidably engaged slides of substantially equal length, one slide being U-shaped in section and embracing one longitudinal edge and the adjacent portion of the faces of the other slide.

2. A slide rule comprising in combination, two flat slidably engaged slides of substantially equal length, but of unequal width, the outer slide being U-shaped in section and embracing one longitudinal edge and the adjacent portions of the faces of the other slide.

3. A slide rule comprising in combination, two flat slidably engaged slides of substantially equal length, one slide being U-shaped in section and embracing one longitudinal edge and the adjacent portions of the faces of the other slide, the side portions of said U-shaped slide converging towards one another.

4. A slide rule comprising in combination, two flat slidably engaged slides of substantially equal length, one slide being U-shaped in section and embracing one longitudinal edge and the adjacent portions of the faces of the other slide with elastic pressure.

5. A slide rule comprising in combination, two flat slidably engaged slides of substantially equal length, one slide being U-shaped in section and embracing one longitudinal edge and the adjacent portions of the faces of the other slide, a split tube surrounding the whole of the curved portion of said U-shaped slide and another longitudinally split tube inserted in said curved portion.

In testimony whereof I affix my signature.

ING. RICHARD SCHWANDA.